(12) United States Patent
  Kamon

(10) Patent No.: US 11,511,446 B2
(45) Date of Patent: Nov. 29, 2022

(54) JOINT STRUCTURE FOR ROBOT

(71) Applicant: KAWASAKI JUKOGYO KABUSHIKI KAISHA, Kobe (JP)

(72) Inventor: Masayuki Kamon, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 74 days.

(21) Appl. No.: 16/463,897

(22) PCT Filed: Nov. 24, 2017

(86) PCT No.: PCT/JP2017/042236
  § 371 (c)(1),
  (2) Date: May 24, 2019

(87) PCT Pub. No.: WO2018/097251
  PCT Pub. Date: May 31, 2018

(65) Prior Publication Data
  US 2020/0070366 A1    Mar. 5, 2020

(30) Foreign Application Priority Data
  Nov. 24, 2016  (JP) .............................. JP2016-228125

(51) Int. Cl.
  *B25J 17/00*    (2006.01)
  *B25J 9/10*     (2006.01)
  *B25J 9/12*     (2006.01)
(52) U.S. Cl.
  CPC .............. *B25J 17/00* (2013.01); *B25J 9/102* (2013.01); *B25J 9/123* (2013.01)

(58) Field of Classification Search
  CPC ............. B25J 9/123; B25J 17/00; B25J 9/102
  USPC ....................................... 74/490.05
  See application file for complete search history.

(56) References Cited

U.S. PATENT DOCUMENTS

| | | | |
|---|---|---|---|
| 4,573,727 A | 3/1986 | Iikura | |
| 7,555,969 B2 * | 7/2009 | Okazaki | B25J 9/1075 74/490.05 |
| 2003/0101838 A1 * | 6/2003 | Shinozaki | A61F 2/585 74/490.05 |

(Continued)

FOREIGN PATENT DOCUMENTS

| | | |
|---|---|---|
| JP | S60-52294 A | 3/1985 |
| JP | S60-127983 A | 7/1985 |

(Continued)

*Primary Examiner* — Zakaria Elahmadi
(74) *Attorney, Agent, or Firm* — Oliff PLC

(57) ABSTRACT

A joint structure for a robot includes a first link and a second link, rotatably coupled to each other through a joint part. The joint part has a first rotary member so that an axial center thereof is oriented in a first direction and connected to the first link, and a pair of the second rotary members so that axial centers thereof are oriented in a second direction. A first linear-motion actuator is connected at a base-end part thereof to the second link and connected at a tip-end part thereof to the second rotary member. A second linear-motion actuator is connected at a base-end part thereof to the second link and connected at a tip-end part thereof to the second rotary member. The first rotary member is pivoted relatively to the second rotary members by pivoting the second rotary members.

12 Claims, 11 Drawing Sheets

(56) References Cited

U.S. PATENT DOCUMENTS

| | | | |
|---|---|---|---|
| 2011/0067518 A1* | 3/2011 | Park | B25J 15/0009 74/490.04 |
| 2011/0147103 A1* | 6/2011 | Alfayad | B62D 57/032 180/8.5 |
| 2011/0296944 A1* | 12/2011 | Carter | B25J 17/0275 74/490.05 |
| 2012/0067150 A1* | 3/2012 | Zhang | B25J 9/104 74/423 |
| 2012/0176007 A1* | 7/2012 | Takeuchi | H02K 7/116 310/68 B |
| 2014/0137691 A1* | 5/2014 | Nogami | B25J 17/02 74/490.06 |
| 2014/0238177 A1* | 8/2014 | Nagatsuka | B25J 17/0266 74/490.06 |
| 2015/0122559 A1* | 5/2015 | Nagatsuka | B25J 9/1065 180/8.6 |
| 2016/0176044 A1* | 6/2016 | Cole | B25J 9/104 700/258 |
| 2018/0297216 A1* | 10/2018 | Nagatsuka | B25J 17/00 |
| 2019/0184549 A1* | 6/2019 | Lan | B25J 17/00 |

FOREIGN PATENT DOCUMENTS

| | | | |
|---|---|---|---|
| JP | H07-24771 A | | 1/1995 |
| JP | 2002-79487 A | | 3/2002 |
| JP | 2005-161436 A | | 6/2005 |
| JP | 2013-91122 A | | 5/2013 |
| JP | 5872846 B2 | | 3/2016 |
| KR | 101306766 B1 | * | 9/2013 |

* cited by examiner

JOINT STRUCTURE FOR ROBOT

TECHNICAL FIELD

The present disclosure relates to a joint structure for a robot.

BACKGROUND ART

It is known that a joint structure for a robot, which relatively rotates a second member about two mutually-perpendicular axes with respect to a first member (e.g., see Patent Document 1). Moreover, it is known that the waist Yaw-axis driving device which relatively swivels an upper half of a torso part of a humanoid robot to the left and right with respect to a lower half of the torso part (e.g., see Patent Document 2).

REFERENCE DOCUMENTS OF CONVENTIONAL ART

Patent Documents

[Patent Document 1] JP5,872,846B2
[Patent Document 2] JP2005-161436A

DESCRIPTION OF THE DISCLOSURE

Problems to be Solved by the Disclosure

The present inventor has conceived of a joint structure for a robot having a novel structure, which is different from the joint structures disclosed in Patent Document 1 etc. One purpose of the present disclosure is to provide a joint structure for a robot having a novel structure.

SUMMARY OF THE DISCLOSURE

A joint structure for a robot according to one aspect of the present disclosure includes a first link and a second link, rotatably coupled to each other through a joint part, a first linear-motion actuator and a second linear-motion actuator. Each linear-motion actuator has a main body and a shaft member configured to linearly move in an axial center direction relatively to the main body. The joint part has a first rotary member and a pair of the second rotary members. The first rotary member is disposed so that an axial center thereof is oriented in a first direction and connected to the first link. The pair of the second rotary members are disposed so that axial centers thereof are oriented in a second direction perpendicular to the first direction and the second rotary members engage with the first rotary member. The first linear-motion actuator is connected at a base-end part thereof to the second link and connected at a tip-end part thereof to one of the second rotary members, and pivots the second rotary member by linearly moving the shaft part. The second linear-motion actuator is connected at a base-end part thereof to the second link and connected at a tip-end part thereof to the other second rotary member, and pivots the second rotary member by linearly moving the shaft part. The first rotary member is pivoted relatively to the second rotary members by pivoting the second rotary members.

According to this structure, the connecting direction of the first link and the second link (a direction in which the first link and the second link are lined up) substantially coincides with the axial center direction of the shaft members of the first linear-motion actuator and the second linear-motion actuator. Thus, the length in a direction (specifically, the thickness direction of the robot) perpendicular to the lined-up direction of the first linear-motion actuator and the second linear-motion actuator can be reduced. Therefore, the robot can be downsized.

Effects of the Disclosure

According to the joint structure for the robot of the present disclosure, the robot can be downsized.

MODE FOR CARRYING OUT THE DISCLOSURE

Figure 1:
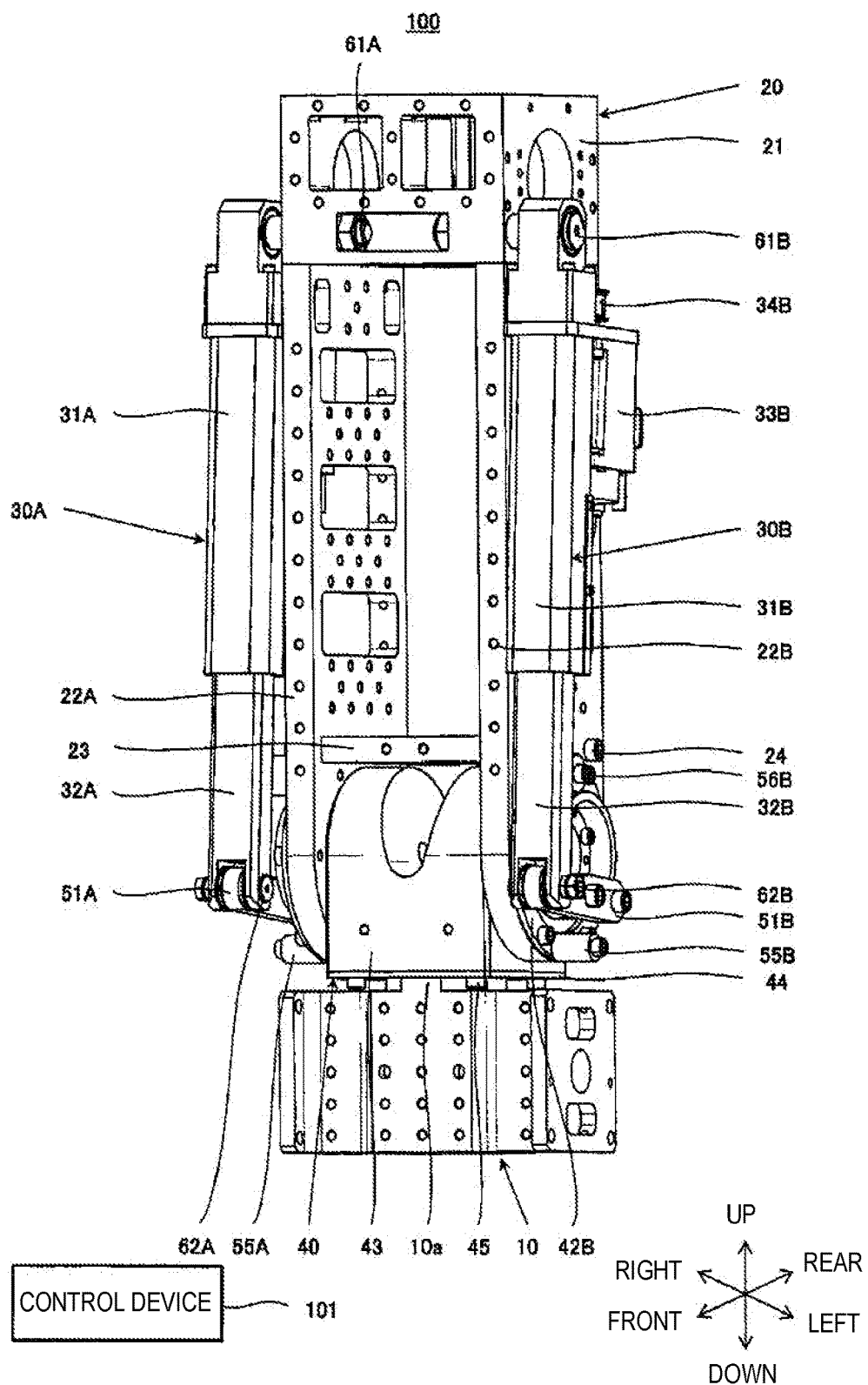
FIG. 1 is a perspective view illustrating an outline structure of a joint structure for a robot according to Embodiment 1.

Hereinafter, one embodiment of the present disclosure will be described with reference to the drawings. Note that, throughout the drawings, the same reference characters are given to the same or corresponding components to omit redundant description. Moreover, throughout the drawings, the components illustrating the present disclosure are extractedly illustrated, and illustration of other components may be omitted. Further, the present disclosure is not limited to following embodiment.

Embodiment 1

A joint structure for a robot according to Embodiment 1 includes a first link and a second link which are rotatably coupled to each other through a joint part, and a first linear-motion actuator and a second linear-motion actuator, each having a main body and a shaft member which linearly moves in an axial center direction relatively to the main body. The joint part has a first rotary member disposed so that its axial center is oriented in a first direction and coupled to the first link, and a pair of second rotary members disposed so that their axial centers are oriented in a second direction that is a direction perpendicular to the first direction and they engage with the first rotary member. The first linear-motion actuator is coupled at a base-end part to the second link and coupled at a tip-end part to one of the second rotary members, and is constructed so as to pivot the second rotary member by the shaft part moving linearly. The second linear-motion actuator is coupled at a base-end part to the second link and coupled at a tip-end part to the other second rotary member, and is constructed so as to pivot the second rotary member by the shaft part moving linearly. The first rotary member is constructed so as to pivot relatively by the second rotary members pivoting.

Alternatively, in the joint structure for the robot according to Embodiment 1, the first link may relatively pivot about the first direction with respect to the second link by one of the first linear-motion actuator and the second linear-motion actuator extending and the other linear-motion actuator contracting.

Alternatively, in the joint structure for the robot according to Embodiment 1, the second link may relatively pivot about the second direction with respect to the first link by both the first linear-motion actuator and the second linear-motion actuator extending or both the linear-motion actuators contracting.

Alternatively, in the joint structure for the robot according to Embodiment 1, the first rotary member and the second rotary member may be each comprised of a bevel gear.

Alternatively, in the joint structure for the robot according to Embodiment 1, the number of teeth of the first rotary member and each second rotary member may be the same.

Alternatively, in the joint structure for the robot according to Embodiment 1, the number of teeth of the first rotary member may be greater than the number of teeth of each second rotary member.

Alternatively, in the joint structure for the robot according to Embodiment 1, the number of teeth of each second rotary member may be greater than the number of teeth of the first rotary member.

Alternatively, in the joint structure for the robot according to Embodiment 1, the first linear-motion actuator may be coupled at a base-end part to the second link so as to be rotatable about the second direction, and coupled at a tip-end part to the second rotary member so as to be rotatable about the second direction. The second linear-motion actuator may be coupled at a base-end part to the second link so as to be rotatable about the second direction and coupled at a tip-end part to the other second rotary member so as to be rotatable about the second direction.

Hereinafter, one example of the joint structure for the robot according to Embodiment 1 will be described with reference to FIGS. 1 to 8.

[Structure of Robot]

Figure 2:
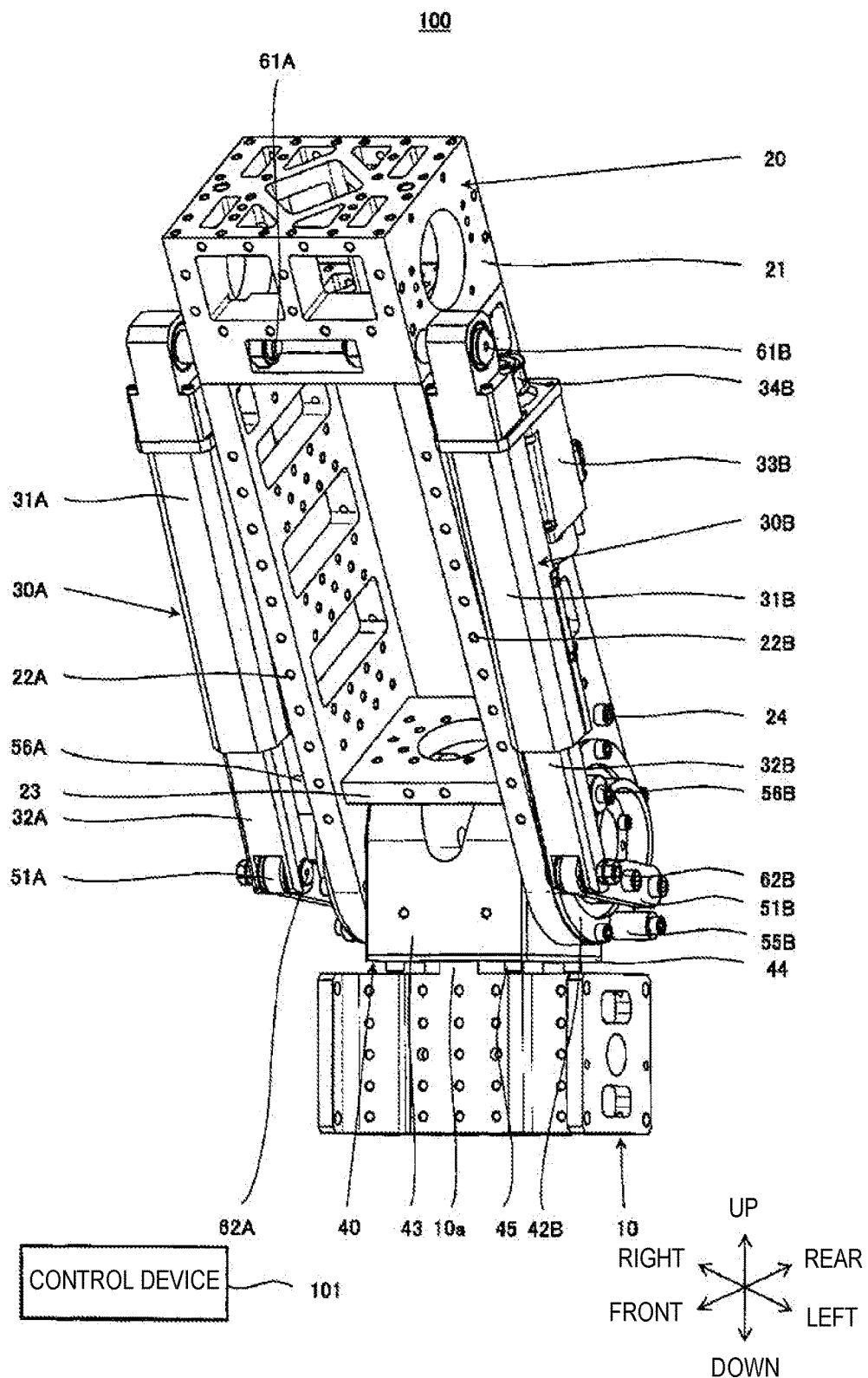
FIG. 2 is a perspective view illustrating the outline structure of the joint structure for the robot according to Embodiment 1.
Figure 3:
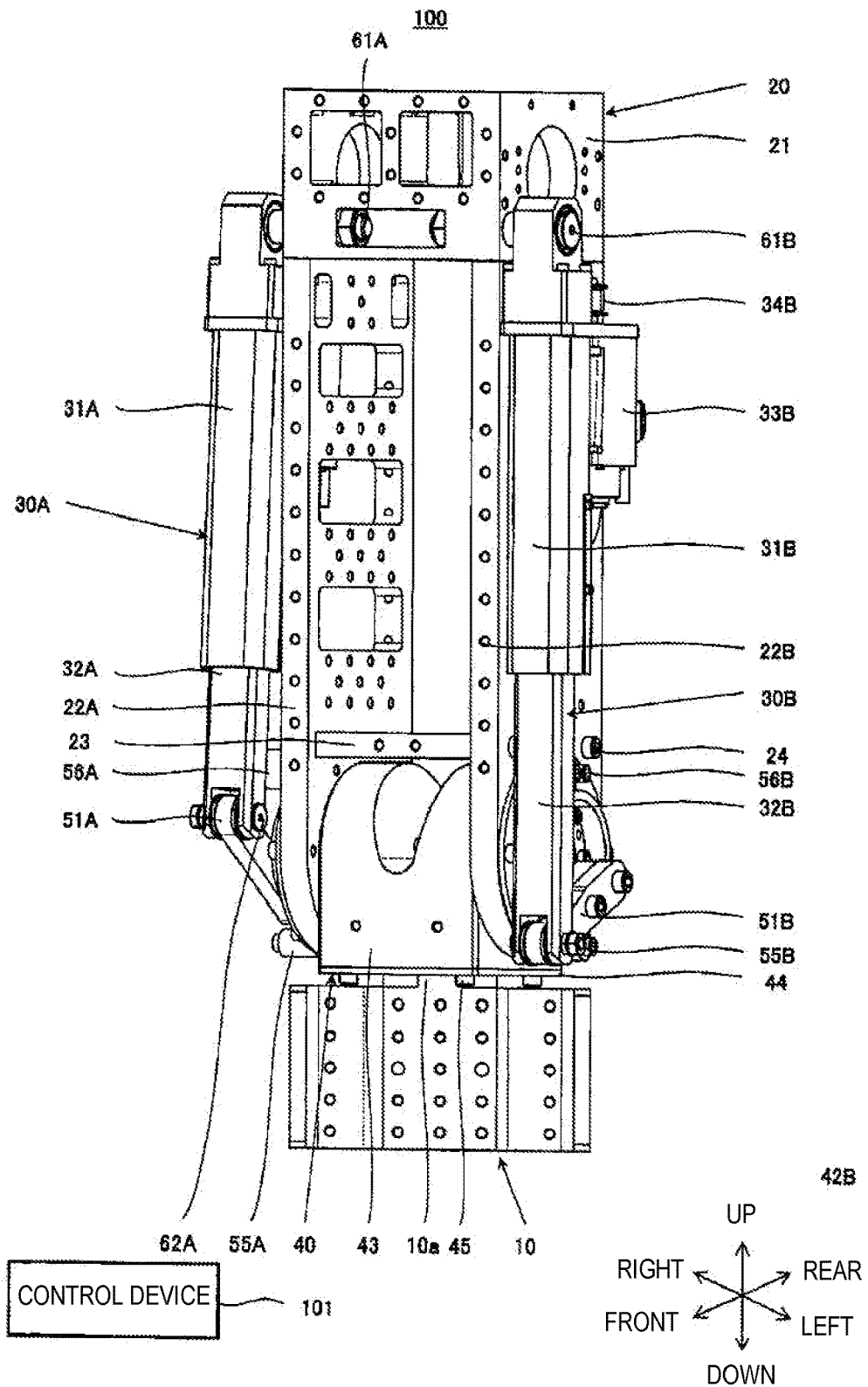
FIG. 3 is a perspective view illustrating the outline structure of the joint structure for the robot according to Embodiment 1.

FIGS. 1 to 3 are perspective views illustrating an outline structure of the joint structure for the robot according to Embodiment 1, where FIG. 1 illustrates a state where the second link stands straight, FIG. 2 illustrates a state where the second link is pivoted about the second direction (forward), and FIG. 3 illustrates a state where the second link is pivoted about the first direction (rightward).

Figure 4:
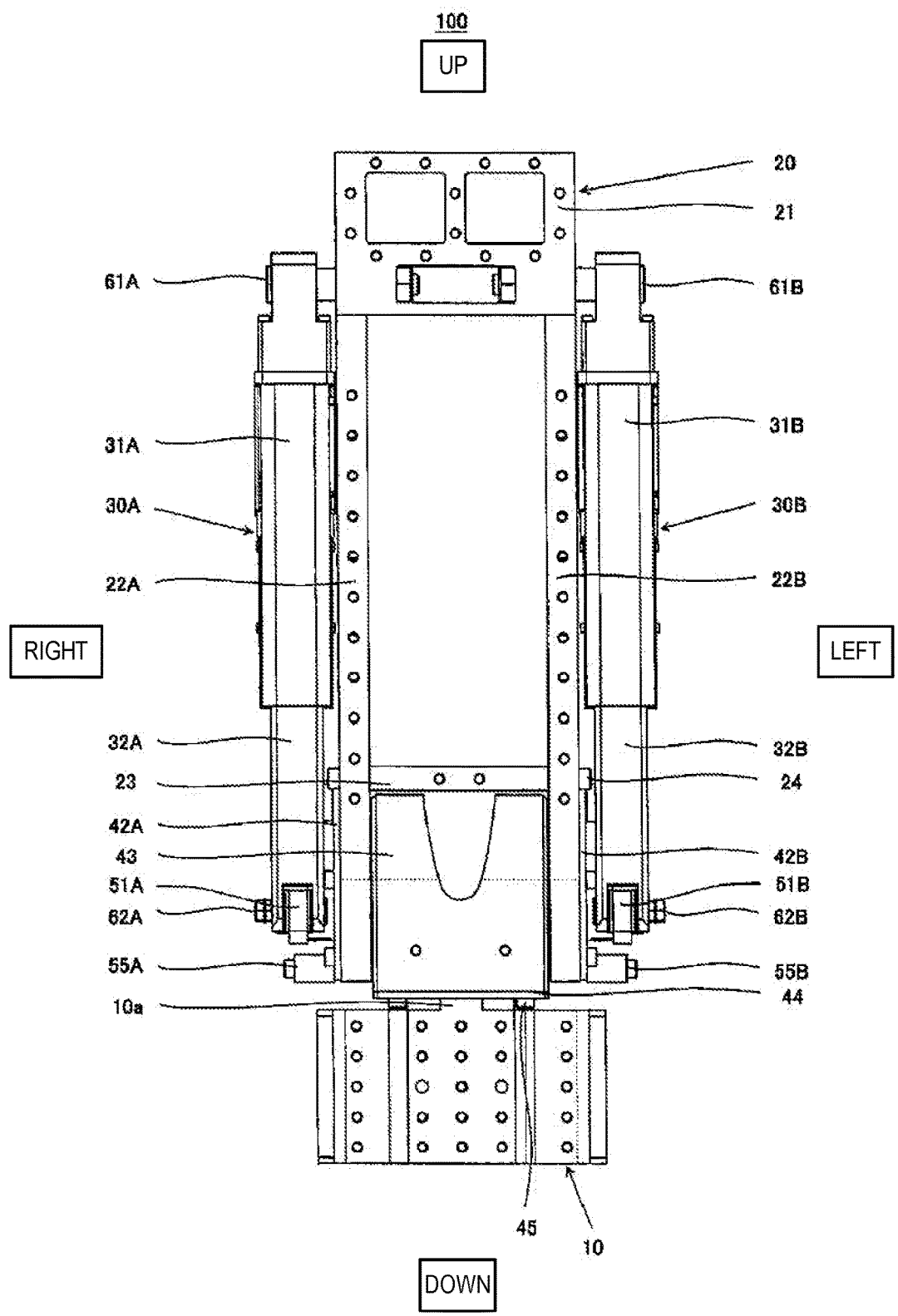
FIG. 4 is a front view illustrating the outline structure of the joint structure for the robot illustrated in FIG. 1.
Figure 5:
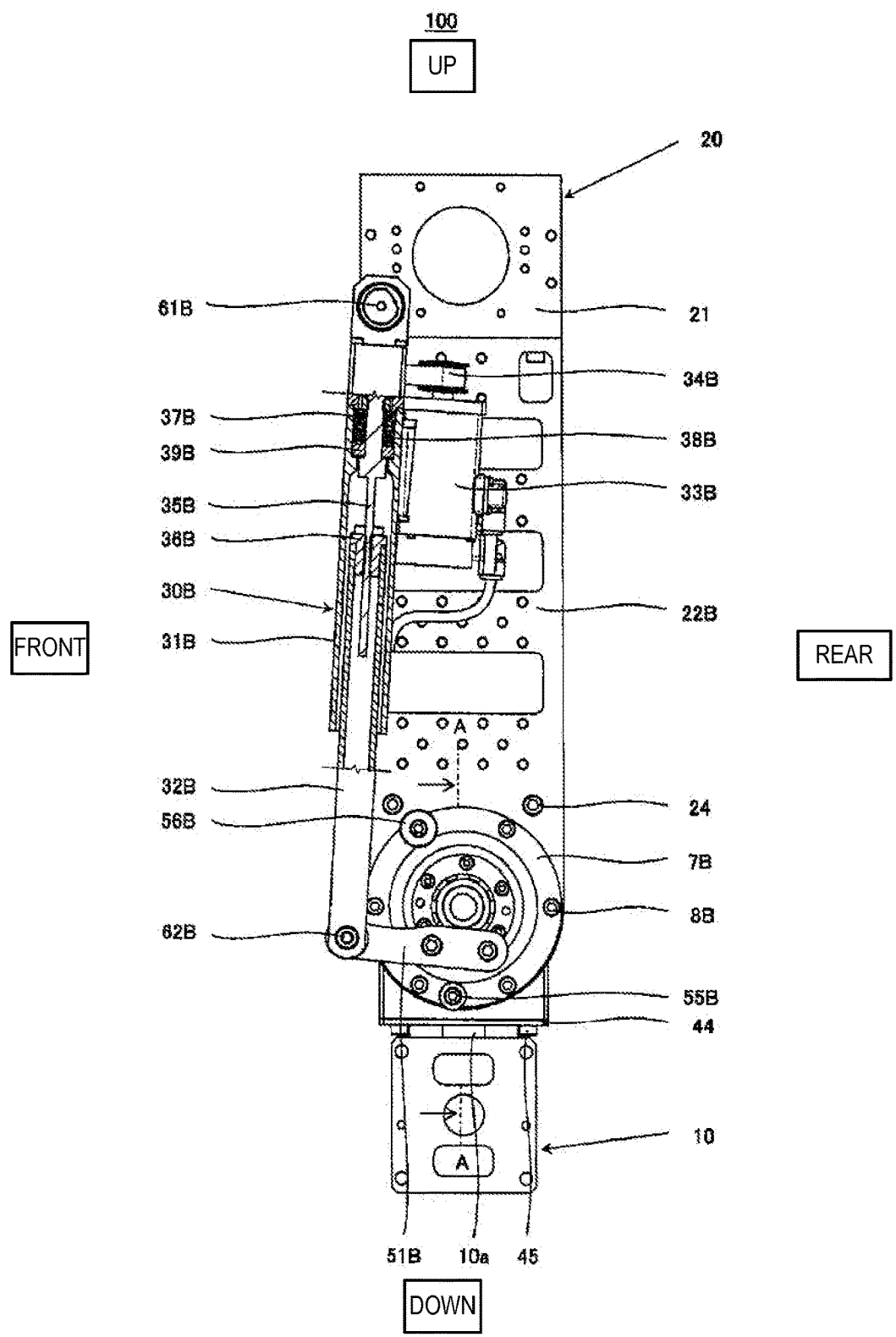
FIG. 5 is a left side view of the joint structure for the robot illustrated in FIG. 1.
Figure 6:
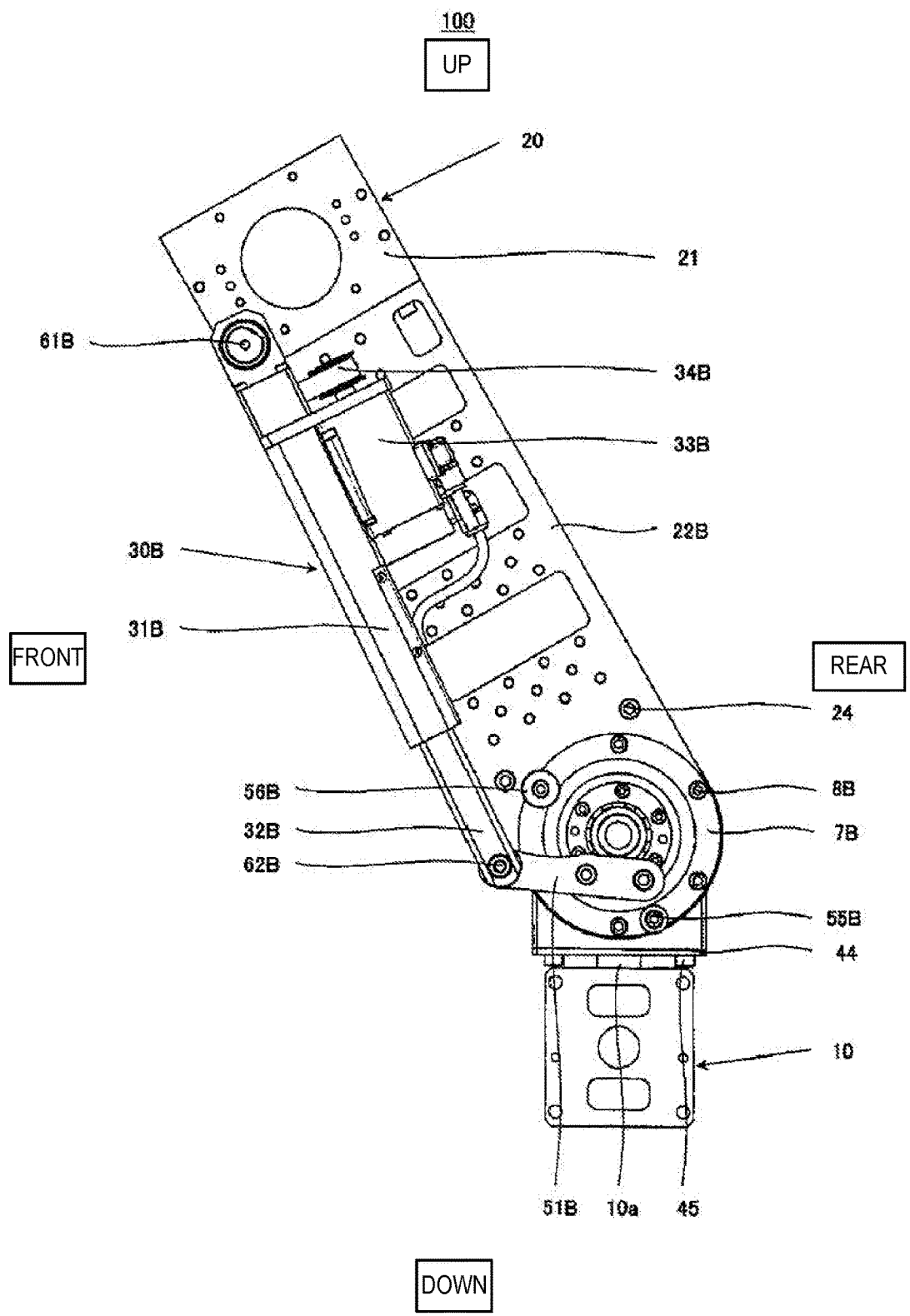
FIG. 6 is a left side view of the joint structure for the robot illustrated in FIG. 1.
Figure 7:
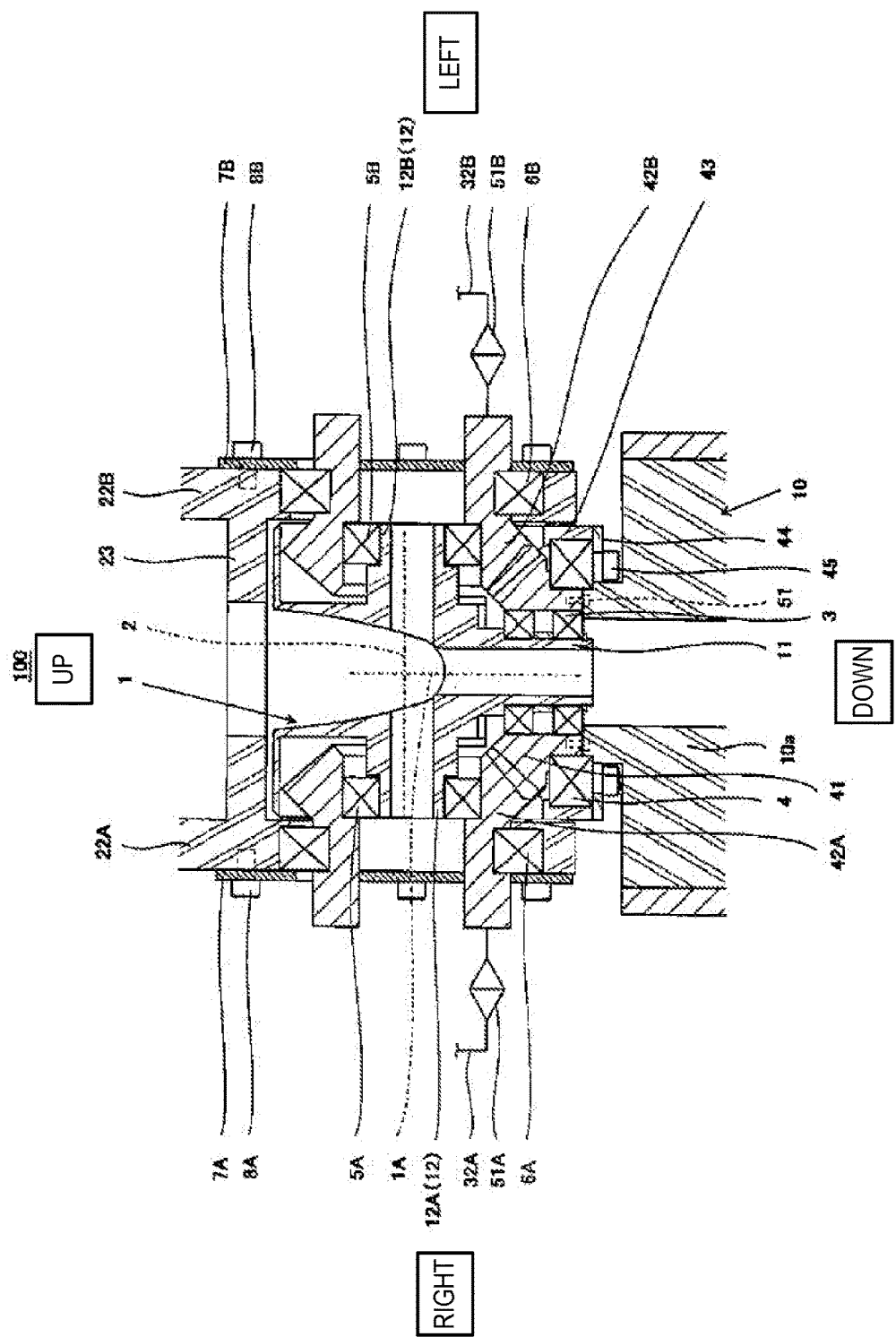
FIG. 7 is a cross-sectional view taken along a line A-A illustrated in FIG. 5.

FIG. 4 is a front view illustrating the outline structure of the joint structure for the robot illustrated in FIG. 1. FIGS. 5 and 6 are left side views of the joint structure for the robot illustrated in FIG. 1, where FIG. 5 illustrates a state where the second link stands straight, and FIG. 6 illustrates a state where the second link is pivoted about the second direction (forward). FIG. 7 is a cross-sectional view taken along a line A-A illustrated in FIG. 5.

Note that, in FIGS. 1 to 3, an up-and-down direction, a front-and-rear direction, and a left-and-right direction of the joint structure for the robot are expressed as an up-and-down direction, a front-and-rear direction, and a left-and-right direction in the figures. In FIG. 4, the up-and-down direction and the left-and-right direction in the joint structure for the robot are expressed as an up-and-down direction and a left-and-right direction in the figure. Moreover, in FIGS. 5 and 6, the up-and-down direction and the front-and-rear direction of the joint structure for the robot are expressed as an up-and-down direction and a front-and-rear direction in the figures. Further, in FIG. 7, the up-and-down direction and the left-and-right direction of the joint structure for the robot are expressed as an up-and-down direction and a left-and-right direction in the figure.

As illustrated in FIGS. 1 to 7, a joint structure 100 for the robot according to Embodiment 1 includes a first link 10, a second link 20, a first linear-motion actuator 30A, a second linear-motion actuator 30B, a joint part 40, and a control device 101. The first link 10 and the second link 20 are rotatably coupled to each other through the joint part 40. The joint structure 100 for the robot according to Embodiment 1 is constructed so that the second link 20 is pivoted relatively to the first link 10 by the first linear-motion actuator 30A and the second linear-motion actuator 30B carrying out an extend and retract operation.

Note that, in the joint structure 100 for the robot according to Embodiment 1, for example, the first link 10 may constitute a lower half part of a torso of the robot, the second link 20 may constitute an upper half part of the torso of the robot, and the joint part 40 may constitute a waist joint of the robot. Alternatively, in the joint structure 100, for example, the first link 10 may constitute a hand part of the robot, the second link 20 may constitute a forearm part of the robot, and the joint part 40 may constitute a wrist joint. Alternatively, in the joint structure 100, for example, the first link 10 may constitute a foot part of the robot, the second link 20 may constitute a lower thigh part of the robot, and the joint part 40 may constitutes an ankle joint.

Moreover, the control device 101 may be disposed in the first link 10, may be disposed in the second link 20, or may be disposed in a third casing 33A of the first linear-motion actuator 30A or a third casing 33B of the second linear-motion actuator 30B, which will be described later.

The first link 10 is formed in a box shape, and is coupled to the joint part 40 through a protrusion 10a formed in an upper end face of the first link 10. In more detail, the protrusion 10a of the first link 10 is fixed to a lower end part of a first rotary member 41 of the joint part 40 with bolts 51 (see FIG. 7). Thus, the first link 10 is relatively rotatable about a first shaft part 11 with respect to the second link 20 in connection with the rotation of the first rotary member 41. Note that the first shaft part 11 is disposed so that its axial center 1A is oriented in the first direction (here, the up-and-down direction).

The second link 20 is coupled to the joint part 40 through a pair of second rotary members 42A and 42B so as to be rotatable around a second shaft part 12 (see FIG. 7). Moreover, the second link 20 has a box-shaped first member 21, a pair of second members 22A and 22B, and a third member 23. The second members 22A and 22B are disposed so that they extend downwardly from a lower end face of the first member 21 and sandwich the joint part 40. Moreover, a through-hole is formed in a lower end part of each of the second members 22A and 22B. The third member 23 is disposed so as to bridge between the second members 22A and 22B, and is fixed to the second members 22A and 22B with bolts 24.

Moreover, a base-end part of the first linear-motion actuator 30A is connected to a right side surface of the first member 21 of the second link 20 so as to be rotatable around a first shaft member 61A. Similarly, a base-end part of the second linear-motion actuator 30B is connected to a left side surface of the first member 21 of the second link 20 so as to be rotatable around a first shaft member 61B. Note that the first shaft members 61A and 61B are disposed so that their axial centers are oriented in the second direction (here, the left-and-right direction) which is a direction perpendicular to the first direction.

A tip-end part of the first linear-motion actuator 30A is connected to the second rotary member 42A of the joint part 40 through a first connecting member 51A. For example, the tip-end part of the first linear-motion actuator 30A is connected to a tip-end part of the first connecting member 51A so as to be rotatable about a second shaft member 62A. A base-end part of the first connecting member 51A is suitably fixed to an outer circumferential surface of the second rotary member 42A. Thus, the tip-end part of the first linear-motion actuator 30A is connected with the second rotary member 42A, and the second rotary member 42A is pivoted by a shaft part of the first linear-motion actuator 30A linearly moving (the extend and retract movement).

Moreover, a pin-shaped first stop member 55A and a pin-shaped second stop member 56A are provided at suitable locations of a lower end part of the second member 22A of the second link 20 (see FIGS. 2 and 3). The first stop member 55A and the second stop member 56A define a pivoting range of the first connecting member 51A.

Similarly, a tip-end part of the second linear-motion actuator 30B is connected to a second rotary member 42B of the joint part 40 through a first connecting member 51B. For example, the tip-end part of the second linear-motion actuator 30B is connected to a tip-end part of the first connecting member 51B so as to be rotatable about a second shaft member 62B. A base-end part of the first connecting member 51B is suitably fixed to an outer circumferential surface of the second rotary member 42B. Thus, the tip-end part of the second linear-motion actuator 30B is connected to the second rotary member 42B, and the second rotary member 42B is pivoted by a shaft part of the second linear-motion actuator 30B linearly moving (the extend and retract movement).

Moreover, a pin-shaped first stop member 55B and a pin-shaped second stop member 56B are provided at suitable locations of a lower end part of the second member 22B of the second link 20. The first stop member 55B and the second stop member 56B define a pivoting range of the first connecting member 51B.

The joint part 40 has a shaft member 1, the first rotary member 41, the second rotary members 42A and 42B, a covering member 43 which covers the second rotary members 42A and 42B, and a plate member 44. The covering member 43 is fixed to the plate member 44 with bolts 45. Moreover, the joint part 40 pivots the second link 20 about the second direction relatively to the first link 10, and pivots the first link 10 about the first direction relatively to the second link 20.

As illustrated in FIG. 7, the shaft member 1 is formed in a substantially cross shape, and a dent of a substantially U-shape is formed in an upper part thereof. Moreover, as described above, the shaft member 1 has the first shaft part 11 disposed so that its axial center 1A is oriented in the first direction, and the second shaft part 12 disposed so that its axial center 2 is oriented in the second direction. Note that, in the following, the second shaft part 12 disposed on the left side is referred to as a second shaft part 12A, and the second shaft part 12 disposed on the right side is referred to as a second shaft part 12B, for convenience.

The first rotary member 41 is fittedly inserted into the first shaft part 11 through a bearing member 3. The first rotary member 41 is comprised of a bevel gear, and a bearing member 4 is fittedly inserted into a base-end part (a lower end part; the back side of the teeth) of the first rotary member 41. The first shaft part 11 (shaft member 1) and the first rotary member 41 are placed on the plate member 44 through the bearing member 4. Note that, the bearing member 3 is placed on an upper end face of the protrusion 10a of the first link 10. The bearing member 3 may be, for example, a ball bearing, and the bearing member 4 may be, for example, a ball bearing.

The second rotary member 42A is fittedly inserted into the second shaft part 12A through a bearing member 5A. The second rotary member 42A is comprised of a bevel gear, and a bearing member 6A is fittedly inserted into a base-end part (a right end part; the back side of the teeth) of the second rotary member 42A. A lid member 7A is disposed on a right circumferential surface of the bearing member 6A, and the lid member 7A is fixed to the second member 22A with bolts 8A. Note that the bearing member 5A may be, for example, a ball bearing. Moreover, the bearing member 6A may be, for example, a ball bearing.

In details, the base-end part of the second rotary member 42A is inserted into the through-hole formed in the lower end part of the second member 22A. The bearing member 6A is disposed in the through-hole of the second member 22A so that an outer circumferential surface of the bearing member 6A fits to an outer circumferential surface of the through-hole. Moreover, the base-end part of the second rotary member 42A is disposed so as to be fitted into the bearing member 6A. The lid member 7A is disposed so as to bridge between the right circumferential surface of the bearing member 6A and a right side surface of the second member 22A, and is fixed to the second member 22A with bolts 8A.

Similarly, the second rotary member 42B is fittedly inserted into the second shaft part 12B through a bearing member 5B. The second rotary member 42B is comprised of a bevel gear, and a bearing member 6B is fittedly inserted into a base-end part (a left end part; the back side of the teeth) of the second rotary member 42B. A lid member 7B is disposed on a left circumferential surface of the bearing member 6B, and the lid member 7B is fixed to the second member 22B with bolts 8B. Note that the bearing member 5B may be, for example, a ball bearing. Moreover, the bearing member 6B may be, for example, a ball bearing.

In details, the base-end part of the second rotary member 42B is inserted into a through-hole formed in the lower end part of the second member 22B. The bearing member 6B is disposed in the through-hole of the second member 22B so that an outer circumferential surface of the bearing member 6B fits to an outer circumferential surface of the through-hole. Moreover, the base-end part of the second rotary member 42B is disposed so as to be fitted into the bearing member 6B. The lid member 7B is disposed so as to bridge between a left circumferential surface of the bearing member 6B and a left side surface of the second member 22B, and is fixed to the second member 22B with bolts 8B.

The first rotary member 41 and the second rotary member 42A are disposed so as to mesh (engage) with each other, and similarly, the first rotary member 41 and the second rotary member 42B are disposed so as to mesh (engage) with each other.

Note that the first rotary member 41 and the second rotary members 42A and 42B may have the same number of teeth. Alternatively, for the first rotary member 41 and the second rotary members 42A and 42B, the number of teeth of the first rotary member 41 may be greater than the number of teeth of the second rotary members 42A and 42B. Alternatively, for the first rotary member 41 and the second rotary members 42A and 42B, the number of teeth of the second rotary members 42A and 42B may be greater than the number of teeth of the first rotary member 41.

Moreover, in Embodiment 1, although the first rotary member 41 and the second rotary members 42A and 42B are each comprised of a bevel gear, the present disclosure is not limited to this structure. The present disclosure may be constructed such that the second rotary members 42A and 42B pivot to pivot the first rotary member 41. For example, the first rotary member 41 and the second rotary members 42A and 42B may be comprised of a friction transmission mechanism in which the first rotary member 41 and the second rotary members 42A and 42B pivot by friction.

Specifically, for example, the first rotary member 41 and the second rotary members 42A and 42B may be each formed in a truncated cone shape, and a circumferential surface of the first rotary member 41 may contact circumferential surfaces of the second rotary members 42A and 42B. The first rotary member 41 may be pivoted by friction of the circumferential surfaces in accordance with the pivoting of the second rotary members 42A and 42B.

Moreover, the first linear-motion actuator 30A includes a first casing (main body) 31A, a second casing 32A, the third casing, a drive motor (not illustrated) accommodated in the third casing, a rotary transmission mechanism, and a ball-screw mechanism (not illustrated) having a threaded shaft (shaft member) and a nut member. Rotation of the drive motor is transmitted to the threaded shaft through the rotary transmission mechanism, and the rotation of the threaded shaft causes the nut member to reciprocate.

Similarly, the second linear-motion actuator 30B includes a first casing 31B, a second casing 32B, the third casing 33B, a drive motor (not illustrated) accommodated in the third casing 33B, a rotary transmission mechanism 34B, and a ball-screw mechanism having a threaded shaft (shaft member) 35B and a nut member 36B (see FIG. 5). Rotation of the drive motor is transmitted to the threaded shaft 35B through the rotary transmission mechanism 34B, and the rotation of the threaded shaft 35B causes the nut member 36B to reciprocate.

Below, a structure of the second linear-motion actuator 30B will be described in detail with reference to FIG. 5. Note that, since the first linear-motion actuator 30A is constructed similar to the second linear-motion actuator 30B, the detailed description thereof is omitted.

In Embodiment 1, the first to third casings 31B-33B are each formed in a rectangular parallelepiped shape. The first casing 31B and the third casing 33B are provided in parallel to each other so that their extending directions become parallel to each other. The second casing 32B is disposed so that its outer circumferential surface slides on an inner circumferential surface of the first casing 31B.

Stationary members 37B-39B are fixed to an upper end part of the inner circumferential surface of the first casing 31B. Coaxial through-holes are formed in the stationary members 37B-39B, and a base-end part of the threaded shaft 35B is fittedly inserted into the through-holes. Thus, the threaded shaft 35B is rotatably fixed to the first casing 31B.

A thread (not illustrated) is formed in an outer surface of a tip-end part of the threaded shaft 35B. The nut member 36B is disposed so as to threadedly engage with the thread. Note that, since the nut member 36B is constructed similar to the nut member of a known ball-screw mechanism, the detailed description thereof is omitted.

A base-end part of the second casing 32B is fixed to the nut member 36B. The base end of the second casing 32B is opened, and the tip-end part of the threaded shaft 35B is inserted into the opening. Moreover, a tip-end part of the second casing 32B is closed, and a through-hole extending in the left-and-right direction is formed in the tip-end part. As described above, the second shaft member 62B is fittedly inserted into the through-hole.

A through-hole is formed in an upper end face of the third casing 33B, and an output shaft of the drive motor (not illustrated) is inserted into the through-hole. The drive motor may be, for example, a servomotor which is servo-controlled by the control device 101. Moreover, the third casing 33B is provided with a rotation sensor (not illustrated) which detects a rotational position of the drive motor, and a current sensor (not illustrated) which detects current for controlling the rotation of the drive motor. The rotation sensor may be, for example, an encoder. Note that electric power is supplied to the drive motor (electric motor) through wiring connected to a battery disposed inside the robot, an electric socket disposed inside the house, etc. (none of them is illustrated).

Moreover, the base-end part of the threaded shaft 35B and an output shaft of the drive motor are connected with each other through the rotary transmission mechanism 34B. The rotary transmission mechanism 34B may be any kind of mechanism, which is capable of transmitting the rotation of the drive motor to the threaded shaft 35B.

For example, as the rotary transmission mechanism 34B, a form may be adopted in which a pulley is attached to each of the base-end part of the threaded shaft 35B and the output shaft of the drive motor, and a belt is wound around the pulleys to transmit the rotation of the drive motor to the threaded shaft 35B. Moreover, for example, as the rotary transmission mechanism 34B, a form may be adopted in which a gear is attached to each of the base-end part of the threaded shaft 35B and the output shaft of the drive motor, and these gears are meshed with each other to transmit the rotation of the drive motor to the threaded shaft 35B.

Next, a configuration of the control device 101 will be described with reference to FIG. 8.

Figure 8:
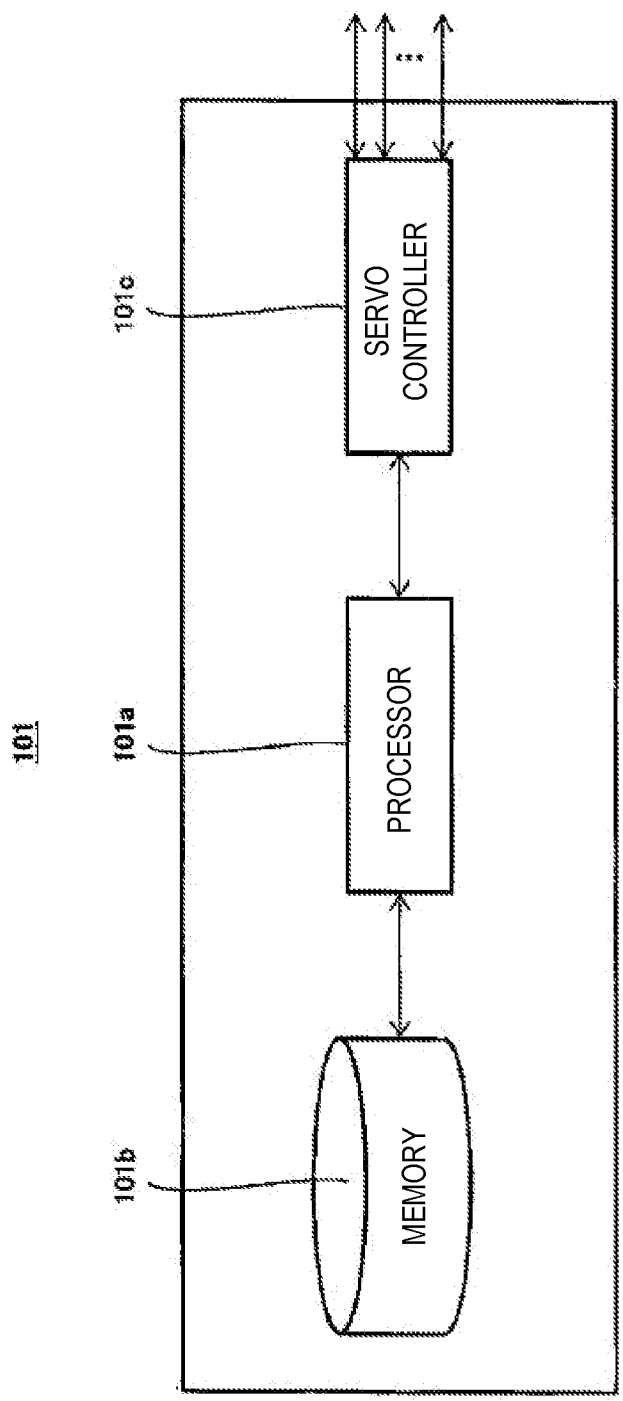
FIG. 8 is a functional block diagram schematically illustrating a configuration of a control device in the joint structure for the robot illustrated in FIG. 1.

FIG. 8 is a functional block diagram schematically illustrating the configuration of the control device in the joint structure for the robot illustrated in FIG. 1.

Figure 9:
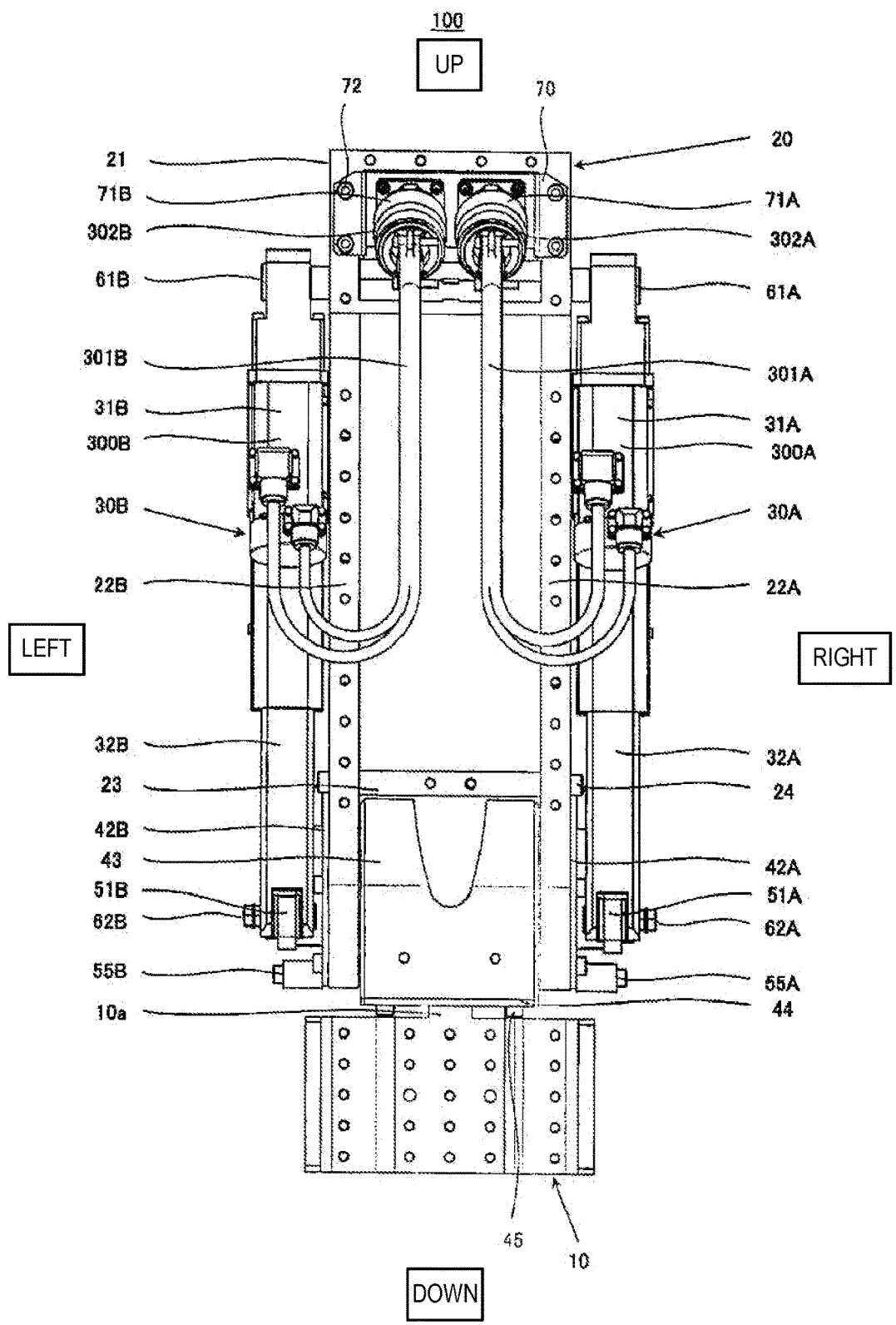
FIG. 9 is a rear view illustrating an outline structure of a joint structure for the robot according to Embodiment 2.

As illustrated in FIG. 9, the control device 101 includes a processor 101*a*, such as a CPU, a memory 101*b*, such as a ROM and/or a RAM, and a servo controller 101*c*. The control device 101 is, for example, a robot controller provided with a computer, such as a microcontroller.

Note that the control device 101 may be comprised of a single control device 101 which carries out a centralized control, or may be comprised of a plurality of control devices 101 which collaboratively carry out a distributed control. Moreover, in Embodiment 1, although the memory 101*b* is disposed inside the control device 101, the present disclosure is not limited to this structure but the memory 101*b* may be provided separately from the control device 101.

Information on a basic program, various fixed data, etc. is stored in the memory 101*b*. The processor 101*a* controls various operations of the robot by reading and executing software, such as the basic program stored in the memory 101b. That is, the processor 101a generates a control command for the robot, and outputs it to the servo controller 101c. The servo controller 101c controls the drive of the servo motor provided to each joint based on the control command generated by the processor 101a.

[Operation and Effects of Joint Structure for Robot]

Next, operation and effects of the joint structure 100 according to Embodiment 1 will be described. Note that, the following operation is executed by the processor 101a of the control device 101 reading a given program stored in the memory 101b.

First, as illustrated in FIG. 1, suppose that the second link 20 is in a state where it stands up (upright). Then, suppose that the processor 101a of the control device 101 drives the drive motor of the first linear-motion actuator 30A so that the nut member of the first linear-motion actuator 30A moves toward a tip-end part of the threaded shaft, and drives the drive motor of the second linear-motion actuator 30B so that the nut member 36B of the second linear-motion actuator 30B moves toward the tip-end part of the threaded shaft 35B.

Then, the second casing 32A of the first linear-motion actuator 30A moves toward the first casing 31A so that the first linear-motion actuator 30A contracts. Similarly, the second casing 32B of the second linear-motion actuator 30B moves toward the first casing 31B so that the second linear-motion actuator 30B contracts.

Thus, a distance between the first shaft member 61A and the second shaft member 62A and a distance between the first shaft member 61B and the second shaft member 62B are reduced, and the second link 20 is pivoted forward around the second shaft part 12 of the shaft member 1 with respect to the first link 10, and becomes in a state where the second link 20 is inclined, as illustrated in FIG. 2.

On the other hand, as illustrated in FIG. 2, when the second link 20 is in the inclined state, suppose that the control device 101 drives the drive motor of the first linear-motion actuator 30A so that the nut member of the first linear-motion actuator 30A moves toward the base-end part of the threaded shaft, and drives the drive motor of the second linear-motion actuator 30B so that the nut member 36B of the second linear-motion actuator 30B moves toward the base-end part of the threaded shaft 35B.

Then, the second casing 32A of the first linear-motion actuator 30A moves so as to be separated from the first casing 31A, and the first linear-motion actuator 30A extends. Similarly, the second casing 32B of the second linear-motion actuator 30B moves so as to be separated from the first casing 31B, and the second linear-motion actuator 30B extends.

Thus, a distance between the first shaft member 61A and the second shaft member 62A and a distance between the first shaft member 61B and the second shaft member 62B are increased, and the second link 20 is pivoted rearwardly around the second shaft part 12 of the shaft member 1 with respect to the first link 10, and the second link 20 becomes in a state where it stands straight (upright), as illustrated in FIG. 1.

Moreover, as illustrated in FIG. 1, when the second link 20 is in the upright state, if the control device 101 drives the drive motor of one of the first linear-motion actuator 30A and the second linear-motion actuator 30B so that the nut member moves toward the base-end part of the threaded shaft, and drives the drive motor of the other linear-motion actuator so that the nut member moves toward the tip-end part of the threaded shaft, the lengths of the two linear-motion actuators become different from each other. That is, the distance between the first shaft member 61A and the second shaft member 62A becomes different from the distance between the first shaft member 61B and the second shaft member 62B. For example, as illustrated in FIG. 3, the distance between the first shaft member 61B and the second shaft member 62B becomes larger than the distance between the first shaft member 61A and the second shaft member 62A.

In connection with this, the first connecting member 51A and the first connecting member 51B are pivoted in mutually different directions. For example, as illustrated in FIG. 3, the first connecting member 51A is pivoted using the base-end part as an axis so that the tip-end part is oriented upward, and the first connecting member 51B is pivoted using the base-end part as an axis so that the tip-end part is oriented downward.

Moreover, the second rotary member 42A and the second rotary member 42B are also pivoted in mutually different directions, in association with the pivoting of the first connecting member 51A and the first connecting member 51B. Specifically, for example, as illustrated in FIG. 3, the second rotary member 42A pivots from downward to upward, and the second rotary member 42B pivots from upward to downward.

The first rotary member 41 pivots about the first shaft part 11 of the shaft member 1 by the pivoting of the second rotary member 42A and the second rotary member 42B. Thus, the first link 10 is pivoted about the first shaft part 11 in connection with the pivoting of the first rotary member 41. Specifically, for example, as illustrated in FIG. 3, the first link 10 is pivoted counterclockwise about the first shaft part 11 when seen from above.

Note that, in the joint structure 100 for the robot according to Embodiment 1, both the first linear-motion actuator 30A and the second linear-motion actuator 30B extend or contract to pivot the second link 20 about the second direction with respect to the first link 10, but the present disclosure is not limited to this structure. Both the first linear-motion actuator 30A and the second linear-motion actuator 30B may extend or contract to pivot the first link 10 about the second direction with respect to the second link 20.

In the joint structure 100 for the robot according to Embodiment 1 constructed in this way, the first linear-motion actuator 30A causes the threaded shaft to move linearly (extend or contract) to pivot the second rotary member 42A, and the second linear-motion actuator 30B causes the threaded shaft 35B to move linearly (extend or contract) to pivot the second rotary member 42B. The first rotary member 41 pivots relatively to the second rotary members 42A and 42B by the pivoting of the second rotary members 42A and 42B.

Thus, the first link 10 connected to first rotary member 41 can pivot about the first direction (the first shaft part 11) relatively to the second link 20, and the second link 20 can pivot about the second direction (the second shaft part 12) relatively to the first link 10.

Moreover, in the joint structure 100 for the robot according to Embodiment 1, the connecting direction of the first link 10 and the second link 20 (a direction in which the first link 10 and the second link 20 are lined up; the up-and-down direction) substantially coincides with the axial center direction of the shaft members of the first linear-motion actuator 30A and the second linear-motion actuator 30B. Thus, the length in a direction (specifically, the thickness direction of the robot; the front-and-rear direction) perpendicular to the lined-up direction of the first linear-motion actuator 30A and the second linear-motion actuator 30B can be reduced. Therefore, the robot can be downsized.

Moreover, in the joint structure 100 for the robot according to Embodiment 1, if the first rotary member 41 and the second rotary members 42A and 42B are constructed so that the number of teeth of the first rotary member 41 is greater than the number of teeth of the second rotary members 42A and 42B, a speed of the pivoting operation of the first link 10 can be made faster than the pivoting speed of the second link 20.

Moreover, in the joint structure 100 for the robot according to Embodiment 1, if first rotary member 41 and the second rotary members 42A and 42B are constructed so that the number of teeth of the second rotary members 42A and 42B is greater than the number of teeth of the first rotary member 41, the amplitude of the pivot of the first link 10 which pivots according to the extend and contract operation of the first linear-motion actuator 30A and the second linear-motion actuator 30B can be reduced.

Therefore, it is not necessary to dispose an expensive and highly-precise rotation sensor or current sensor inside the third casing, and the cost of the joint structure 100 can be reduced, and as a result, the cost of the robot can be reduced. Further, the control of the drive motor by the control device 101 becomes easier.

Further, in the joint structure 100 for the robot according to Embodiment 1, the first linear-motion actuator 30A is coupled at the base-end part to the second link 20 so as to be rotatable around the first shaft member 61A, and coupled at the tip-end part to the second rotary member 42A through the first connecting member 51A so as to be rotatable around the second shaft member 62A.

Similarly, the second linear-motion actuator 30B is coupled at the base-end part to the second link 20 so as to be rotatable around the first shaft member 61B, and coupled at the tip-end part to the second rotary member 42B through the first connecting member 51B so as to be rotatable around the second shaft member 62B.

By the first linear-motion actuator 30A and the second linear-motion actuator 30B carrying out the extend and retract movement, the first link 10 can be pivoted about the first direction or the second direction relatively to the second link 20.

That is, in the joint structure 100 for the robot according to Embodiment 1, by the extend and retract movement of the first linear-motion actuator 30A and the second linear-motion actuator 30B which are coupled through one axis (1 degree of freedom), the first link 10 can be pivoted about two axes (two degrees of freedom) relatively to the second link 20.

Therefore, in the joint structure 100 for the robot according to Embodiment 1, the first link 10 can be pivoted about two axes relatively to the second link 20, with a simple structure.

Embodiment 2

A joint structure for the robot according to Embodiment 2 is constructed so that the joint structure for the robot according to Embodiment 1 further includes a connecting member where plug connectors for wiring are disposed. The second link has a pair of plate members disposed so that their principal surfaces oppose to each other. The first linear-motion actuator and/or the second linear-motion actuator has an electric motor of which a plug provided at a tip-end part of the wiring is connected to the plug connector for wiring. The connecting member is disposed so that the plug is located between the principal surfaces of the pair of plate members.

Alternatively, in the joint structure for the robot according to Embodiment 2, the connecting member may be disposed so as to bridge between the pair of plate members.

Below, one example of the joint structure for the robot according to Embodiment 2 will be described with reference to FIGS. 9 to 11.

FIG. 9 is a rear view illustrating an outline structure of the joint structure for the robot according to Embodiment 2. FIG. 10 is a left side view of the joint structure for the robot illustrated in FIG. 9. FIG. 11 is a cross-sectional view of the joint structure for the robot, taken along a line B-B illustrated in FIG. 10.

Figure 10:
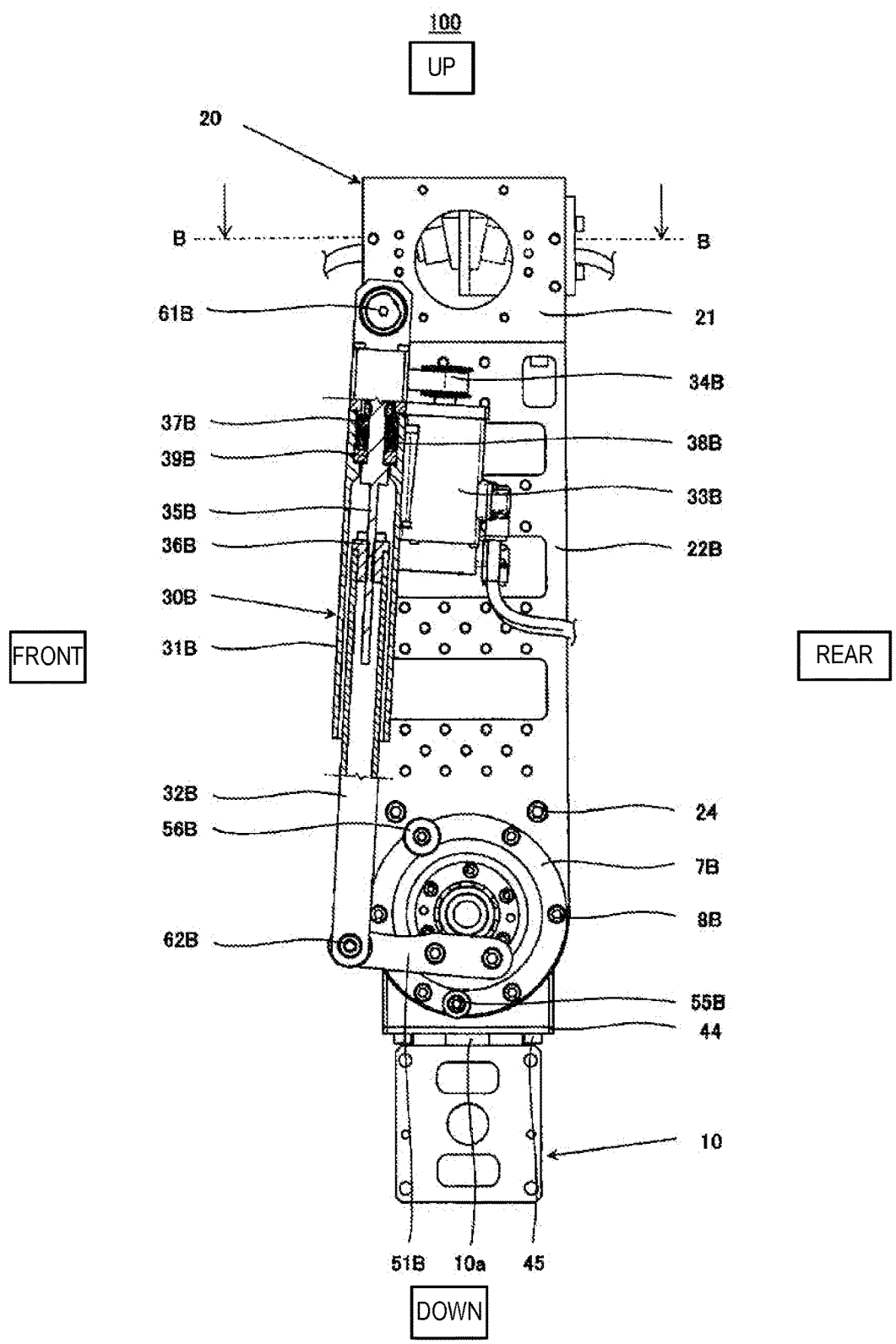
FIG. 10 is a left side view of the joint structure for the robot illustrated in FIG. 9.
Figure 11:
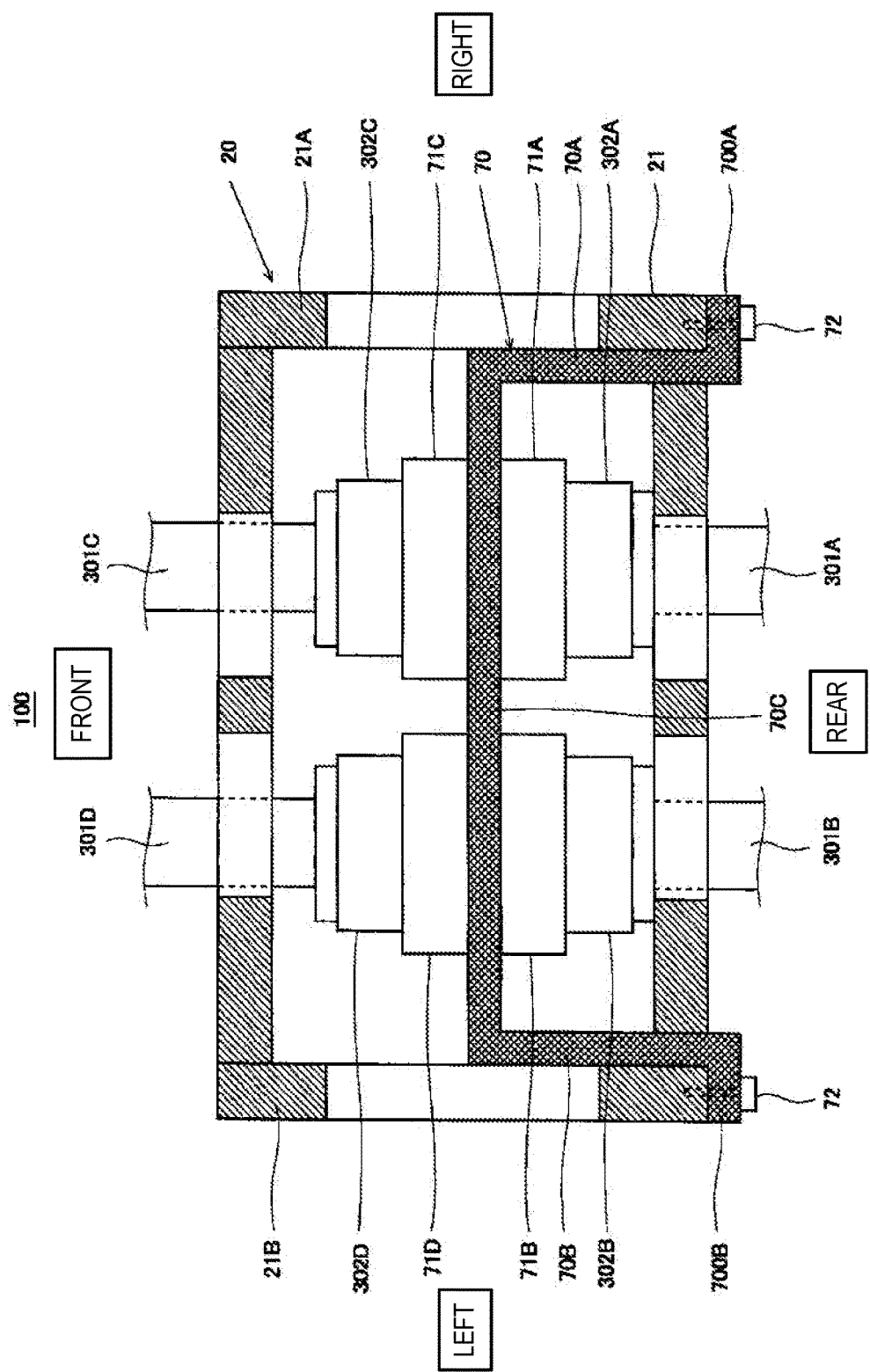
FIG. 11 is a cross-sectional view of the joint structure for the robot illustrated in FIG. 10, taken along a line B-B.

As illustrated in FIGS. 9 to 11, the joint structure 100 for the robot according to Embodiment 2 has the same fundamental structure as the joint structure 100 and for the robot according to Embodiment 1, but it differs in that it further includes a connecting member 70 where electric sockets (plug connectors for wiring) 71A-71D are disposed.

Specifically, the connecting member 70 is disposed so that it bridges between the pair of plate members 21A and 21B of the first member 21 and it is located between the principal surfaces of the plate members 21A and 21B. In more detail, the connecting member 70 is formed in a substantially U-shape, and is comprised of a pair of leg parts 70A and 70B, and a bottom part 70C. Flanges 700A and 700B are formed in tip-end parts of the leg parts 70A and 70B, respectively. The flanges 700A and 700B contact rear surfaces of the plate members 21A and 21B, and are fixed to the plate members 21A and 21B with bolts 72, respectively.

The electric sockets 71A and 71B are disposed on a rear surface of the bottom part 70C of the connecting member 70, and the electric sockets 71C and 71D are disposed on a front surface of the bottom part 70C. The electric socket 71A is connected to a plug 302A, and the plug 302A is connected with a drive motor (electric motor) 300A through a cable 301A. Similarly, the electric socket 71B is connected to a plug 302B, and the plug 302B is connected with a drive motor (electric motor) 300B through a cable 301B.

Moreover, the electric socket 71C is connected to a plug 302C, and the plug 302C is coupled to a cable 301C. Similarly, the electric socket 71D is connected to a plug 302D, and the plug 302D is coupled to a cable 301D. Note that each of the cable 301C and the cable 301D may be connected to a battery disposed inside the robot, an electric motor other than the drive motors 300A and 300B, an electric socket disposed in a house (none of them is illustrated), etc. Alternatively, each of the cable 301C and the cable 301D may be connected to the control device 101.

The joint structure 100 for the robot according to Embodiment 2 constructed in this way also has similar operation and effects to those of the joint structure 100 for the robot according to Embodiment 1.

Moreover, in the joint structure 100 for the robot according to Embodiment 2, the connecting member 70 is disposed so as to bridge between the pair of plate members 21A and 21B of the first member 21, and be located between the principal surfaces of the plate members 21A and 21B. Thus, the plugs 302A-302D can be located between the plate members 21A and 21B. Therefore, as compared with the robot in which the electric sockets 71A-71D are disposed on the external surfaces (whole surface or rear surface) of the plate members 21A and 21B and the plugs 302A-302D are located outside, the downsizing of the robot can be achieved.

Note that, although in the joint structure 100 for the robot according to Embodiment 2 the connecting member 70 is disposed at the first member 21 of the second link 20, the present disclosure is not limited to this structure. For example, the connecting member 70 may be disposed between the principal surfaces of the second members 22A and 22B of the second link 20.

It is apparent for a person skilled in the art that many improvements or other embodiments of the present disclosure are possible from the above description. Therefore, the above description is to be interpreted only as illustration, and it is provided in order to teach a person skilled in the art the best mode that implements the present disclosure. The details of the structures and/or the functions may be changed substantially, without departing from the spirit of the present disclosure.

INDUSTRIAL APPLICABILITY

Since the joint structure for the robot of the present disclosure can achieve the downsizing of the robot, it is useful in the field of industrial robots.

DESCRIPTION OF REFERENCE CHARACTERS

1 Shaft Member
1A Axial Center
2 Axial Center
3 Bearing Member
4 Bearing Member
5A Bearing Member
5B Bearing Member
6A Bearing Member
6B Bearing Member
7A Lid Member
7B Lid Member
8A Bolt
8B Bolt
10 First Link
10a Protrusion
11 First Shaft Part
12 Second Shaft Part
12A Second Shaft Part
12B Second Shaft Part
20 Second Link
21 First Member
21A Plate Member
21B Plate Member
22A Second Member
22B Second Member
23 Third Member
24 Bolt
30A First Linear-Motion Actuator
30B Second Linear-Motion Actuator
31A First Casing
31B First Casing
32A Second Casing
32B Second Casing
33A Third Casing
33B Third Casing
34B Rotary Transmission Mechanism
35B Threaded Shaft
36B Nut Member
37B Stationary Member
38B Stationary Member
39B Stationary Member
40 Joint Part
41 First Rotary Member
42A Second Rotary Member
42B Second Rotary Member
43 Covering Member
44 Plate Member
45 Bolt
51 Bolt
51A First Connecting Member
51B First Connecting Member
52A Second Connecting Member
52B Second Connecting Member
53A Bolt
53B Bolt
54A Bolt
54B Bolt
55A First Stop Member
55B First Stop Member
56A Second Stop Member
56B Second Stop Member
61A First Shaft Member
61B First Shaft Member
62A Second Shaft Member
62B Second Shaft Member
70 Connecting Member
70A Leg Part
70B Leg Part
70C Bottom Part
71A Electric Socket
71B Electric Socket
71C Electric Socket
71D Electric Socket
72 Bolt
100 Joint Structure
101 Control Device
101a Processor
101b Memory
101c Servo Controller
300A Drive Motor
300B Drive Motor
301A Cable
301B Cable
301C Cable
301D Cable
302A Plug
302B Plug
302C Plug
302D Plug
700A Flange
700B Flange

The invention claimed is:

1. A joint structure for a robot, comprising:
a first link and a second link, rotatably coupled to each other through a joint part;
a first linear-motion actuator having a first main body and a first shaft member configured to linearly move in a first axial center direction relatively to the first main body; and
a second linear-motion actuator having a second main body and a second shaft member configured to linearly move in a second axial center direction relatively to the second main body, wherein
the joint part includes a first rotary member with an axial center oriented in a first direction and connected to the first link,
the joint part includes a second rotary member and a third rotary member with axial centers oriented in a second direction perpendicular to the first direction, the second rotary member and the third rotary member engage with the first rotary member, the first linear-motion actuator includes
a first base-end part that is connected to the second link, and
a first tip-end part that is connected to the second rotary member, the first linear-motion actuator pivots the second rotary member by linearly moving the first shaft member, the second linear-motion actuator includes
a second base-end part that is connected to the second link, and
a second tip-end part that is connected to the third rotary member, the second linear-motion actuator pivots the third rotary member by linearly moving the second shaft member, the first rotary member is pivoted relatively to the second rotary member and the third rotary member by pivoting the second rotary member and the third rotary member, the first axial center direction and the second axial center direction are each substantially parallel to the first direction, the axial centers of the second and third rotary members are located on the same straight line extending along the second direction, the joint part further includes a covering member covering at least a portion of an internal structure of the joint part, and the portion of the internal structure that is covered by the covering member includes at least a portion located closer to the first link than the axial centers of the second and third rotary members.

2. The joint structure for the robot of claim 1, wherein the first link pivots about the first direction relatively to the second link by one of the first linear-motion actuator and the second linear-motion actuator extending and the other linear-motion actuator contracting.

3. The joint structure for the robot of claim 1, wherein the second link pivots about the second direction relatively to the first link by both the first linear-motion actuator and the second linear-motion actuator extending, or both the linear-motion actuators contracting.

4. The joint structure for the robot of claim 1, wherein the first rotary member, the second rotary member, and the third rotary member each comprise a bevel gear.

5. The joint structure for the robot of claim 4, wherein the number of teeth of the first rotary member is the same as the number of teeth of each of the second rotary member and the third rotary member.

6. The joint structure for the robot of claim 4, wherein the number of teeth of the first rotary member is greater than the number of teeth of each of the second rotary member and the third rotary member.

7. The joint structure for the robot of claim 4, wherein the number of teeth of each of the second rotary member and the third rotary member is greater than the number of teeth of the first rotary member.

8. The joint structure for the robot of claim 1, wherein the first linear-motion actuator is connected at the first base-end part to the second link to be rotatable about the second direction and connected at the first tip-end part to the second rotary member to be rotatable about the second direction, and
wherein the second linear-motion actuator is connected at the second base-end part to the second link to be rotatable about the second direction and connected at the second tip-end part to the third rotary member to be rotatable about the second direction.

9. The joint structure for the robot of claim 1, further comprising a connecting member with a plug connector for wiring,
wherein the second link has a pair of plate members disposed so that principal surfaces of the plate members oppose to each other,
wherein the first linear-motion actuator and/or the second linear-motion actuator has an electric motor of which a plug at a tip-end part of the wiring is connected to the plug connector for wiring, and
wherein the connecting member is disposed so that the plug is located between the principal surfaces of the pair of plate members.

10. The joint structure for the robot of claim 9, wherein the connecting member is disposed to bridge between the pair of plate members.

11. A joint structure for a robot, comprising:
a first link and a second link, rotatably coupled to each other through a joint part;
a first linear-motion actuator having a first main body and a first shaft member configured to linearly move in a first axial center direction relatively to the first main body; and
a second linear-motion actuator having a second main body and a second shaft member configured to linearly move in a second axial center direction relatively to the second main body, wherein
the joint part includes a first rotary member with an axial center oriented in a first direction and connected to the first link,
the joint part includes a second rotary member and a third rotary member with axial centers oriented in a second direction perpendicular to the first direction,
the second rotary member and the third rotary member engage with the first rotary member,
the first linear-motion actuator includes
a first base-end part that is connected to the second link, and
a first tip-end part that is connected to the second rotary member,
the first linear-motion actuator pivots the second rotary member by linearly moving the first shaft member,
the second linear-motion actuator includes
a second base-end part that is connected to the second link, and
a second tip-end part that is connected to the third rotary member,
the second linear-motion actuator pivots the third rotary member by linearly moving the second shaft member,
the first rotary member is pivoted relatively to the second rotary member and the third rotary member by pivoting the second rotary member and the third rotary member,
the first axial center direction and the second axial center direction are each substantially parallel to the first direction,
the joint part further includes a covering member covering at least a portion of an internal structure of the joint part, and
the portion of the internal structure that is covered by the covering member includes at least a portion of the second rotary member and a portion of the third rotary member.

12. The joint structure for the robot of claim 11, wherein
the axial centers of the second and third rotary members are located on the same straight line extending along the second direction, and
the portion of the internal structure that is covered by the covering member includes at least a portion located closer to the first link than the axial centers of the second and third rotary members.

\* \* \* \* \*